(12) United States Patent
Liu

(10) Patent No.: US 7,597,394 B2
(45) Date of Patent: Oct. 6, 2009

(54) CAR SEAT HEAD REST WITH BUILT-IN SCREEN

(76) Inventor: Edward Liu, 330 Turnbull Canyon Rd., City of Industry, CA (US) 91745

( * ) Notice: Subject to any disclaimer, the term of this patent is extended or adjusted under 35 U.S.C. 154(b) by 4 days.

(21) Appl. No.: 11/591,197

(22) Filed: Oct. 31, 2006

(65) Prior Publication Data

US 2008/0100117 A1    May 1, 2008

(51) Int. Cl.
*A47C 7/72* (2006.01)
*A47C 7/36* (2006.01)
*B60N 2/48* (2006.01)

(52) U.S. Cl. .................... 297/217.3; 297/407
(58) Field of Classification Search ............. 297/217.3, 297/406, 404, 407
See application file for complete search history.

(56) References Cited

U.S. PATENT DOCUMENTS 5,660,441 A * 8/1997 Nagayasu et al. ........... 297/408
6,022,078 A * 2/2000 Chang ......................... 297/391
6,335,965 B1 * 1/2002 Katz .......................... 379/93.12
6,883,870 B2 * 4/2005 Jost ............................ 297/391
7,066,544 B2 * 6/2006 Tseng ......................... 297/391
7,114,780 B1 * 10/2006 Lee et al. .................... 297/406

* cited by examiner

*Primary Examiner*—Joseph F Edell
(74) *Attorney, Agent, or Firm*—Raymond Y. Chan; David and Raymond Patent Firm

(57) ABSTRACT

An adjustable car seat head rest adapted for mounting on a car seat having two spaced apart retention slots, a head pillow having an interior cavity for a supporting frame wherein a display screen is supported thereon, and an adjustable mounting arrangement which allows the head pillow to be mounted onto the car seat. The mounting arrangement further has a length-adjustable sliding guider, two supporting arms downwardly and parallelly extended from the sliding guider to define an engaging distance between them, and an adjuster provided at the sliding guider to selectively adjust the engaging distance of the supporting arms such that the two supporting arms are adapted for engaging with the two retention slots respectively so as to securely support the head pillow on the car seat.

10 Claims, 8 Drawing Sheets

CAR SEAT HEAD REST WITH BUILT-IN SCREEN

BACKGROUND OF THE PRESENT INVENTION

1. Field of Invention

The present invention relates to car seat head rest, and more particularly to a car seat head rest with built-in screen which is adapted for fitting into any type of car seat to provide an added entertainment system for the car.

2. Description of Related Arts

Every car nowadays has a car seat head rest installed on its car seat. A conventional head rest for car seat comprises a head pillow and two parallel supporting rods downwardly extended from the head pillow to slidably engage with two retention slots of the car seat. Accordingly, as different car models have different sizes of car seat, a specific dimensioned head rest might be tailor-made for the specific car seat. In other words, the distance between the two supporting rods of the head rest must match with a distance between the two retention slots of the car seat. Therefore, the driver cannot selectively switch the head rest from one car to another car.

In addition, most cars are modified to build a LCD screen at the rear side of the head rest for entertainment. However, the LCD screen must be incorporated with the original manufactured head rest. Since the original manufactured head rest is mainly made for supporting the head of the driver, the LCD screen does not provide any rigid frame structure to support LCD screen. In other words, such head rest which has the LCD screen often has problem with the LCD screen damaging from vibration and external shocks as the vehicle experience obstacles along the road. This happens because the supporting frame which holds the LCD screen provides a lot of freedom for the LCD screen to move around inside the head rest and thus damaging the electronic components of the LCD screen.

SUMMARY OF THE PRESENT INVENTION

A main object of the present invention is to provide a car seat head rest with built-in screen which allows the head rest to be installed in any type of car seat.

Another object of the present invention is to provide a car seat head rest with built-in screen, wherein two parallel supporting arms are adjustable with a distance therebetween to match with two retention slots of the car seat, such that the car seat head rest is adapted to be self-adjusted to fittedly incorporating with any size or type of car seat.

Another object of the present invention is to provide a car seat head rest which the mounting mechanism is highly resistant to vibration and external impacts thus ensuring the head rest can be firmly mounted onto the car seat.

Another object of the present invention is to provide a car seat head rest with built-in screen to provide entertainment to passengers without alternating the original structure of the car seat.

Another object of the present invention is to provide a car seat head rest with built-in screen which is stably installed within the head rest to protect its electronic components from vibration and external impacts.

Accordingly, in order to accomplish the above objects, the present invention provides an adjustable car seat head rest adapted for mounting on a car seat having two spaced apart retention slots, comprising:

a head pillow having a rear side, a bottom side, and an interior cavity; and an adjustable mounting arrangement, which comprises:

a length-adjustable sliding guider longitudinally supported within the interior cavity of the head pillow;

two supporting arms downwardly and parallelly extended from the sliding guider respectively through the bottom side of the head pillow to define an engaging distance between the two supporting arms; and an adjuster provided at the sliding guider to control a length of the sliding guider so as to selectively adjust the engaging distance of the supporting arms, wherein when the engaging distance of the supporting arms is adjusted corresponding to a distance between the two retention slots of the car seat, the two supporting arms are adapted for slidably engaging with the two retention slots respectively so as to securely support the head pillow on the car seat.

These and other objectives, features, and advantages of the present invention will become apparent from the following detailed description, the accompanying drawings, and the appended claims.

DETAILED DESCRIPTION OF THE PREFERRED EMBODIMENT

Figure 1:
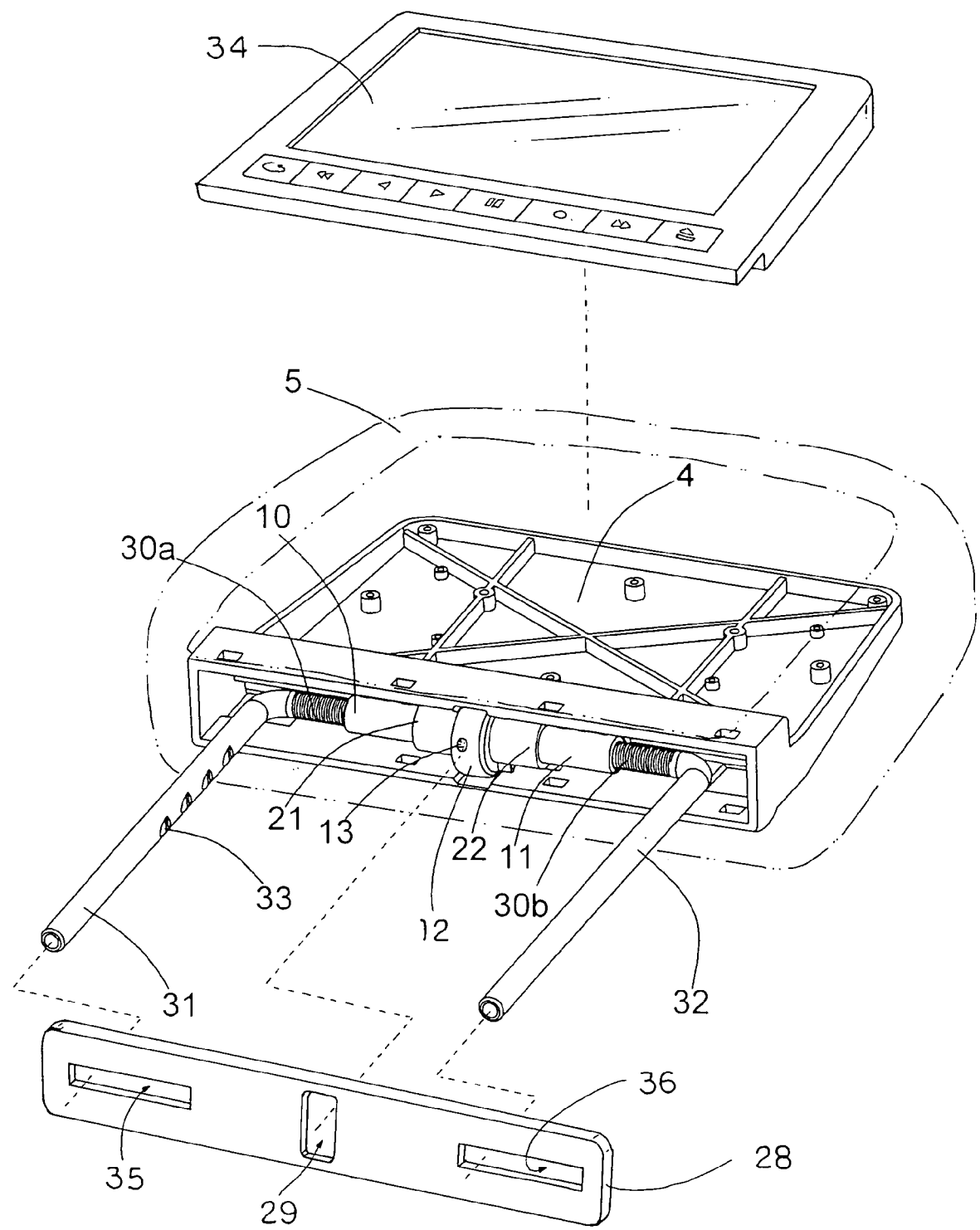
FIG. 1 is an exploded perspective view of the car seat head rest for mounting on a car seat with the display screen according to a preferred embodiment of the present invention.
Figure 3:
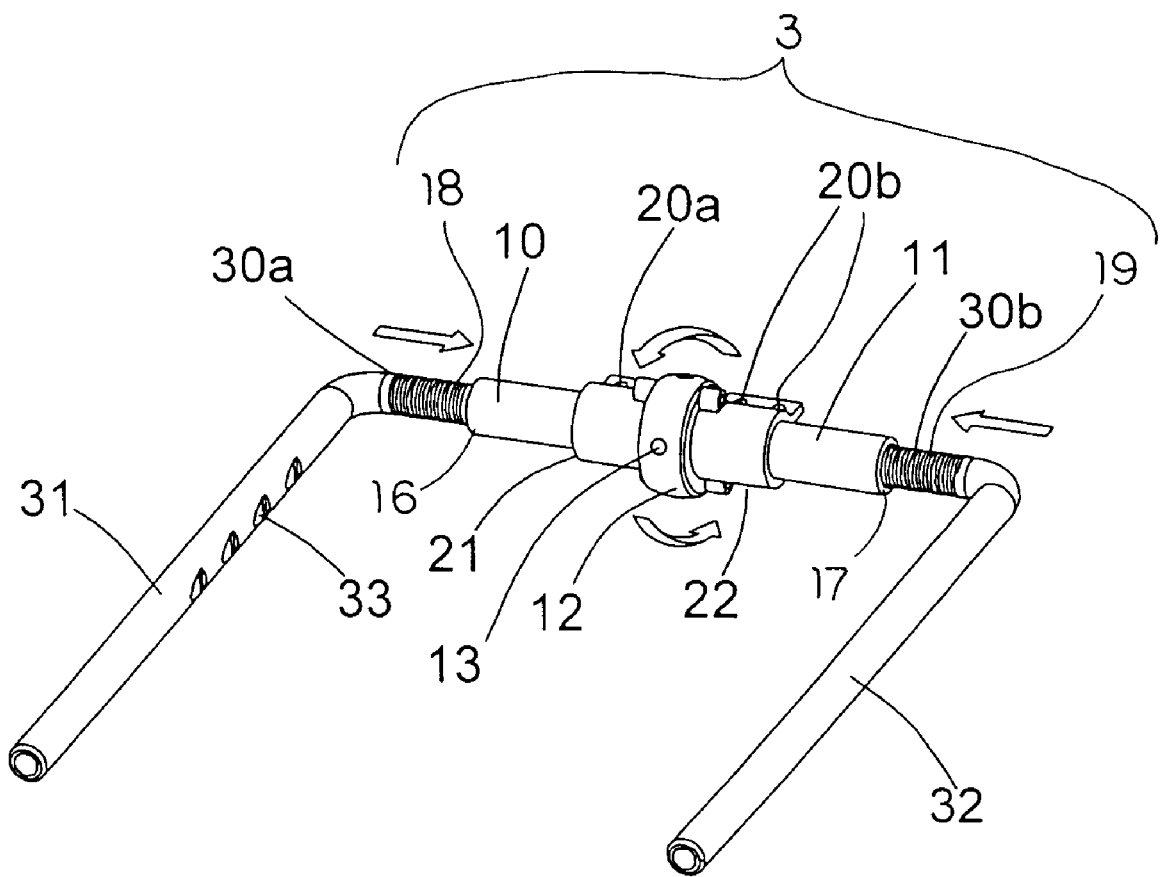
FIG. 3 is a perspective view of the adjustable mounting arrangement illustrating a rotation of the manual tuner that minimizes the engaging distance according to the preferred embodiment of the present invention.
Figure 4:
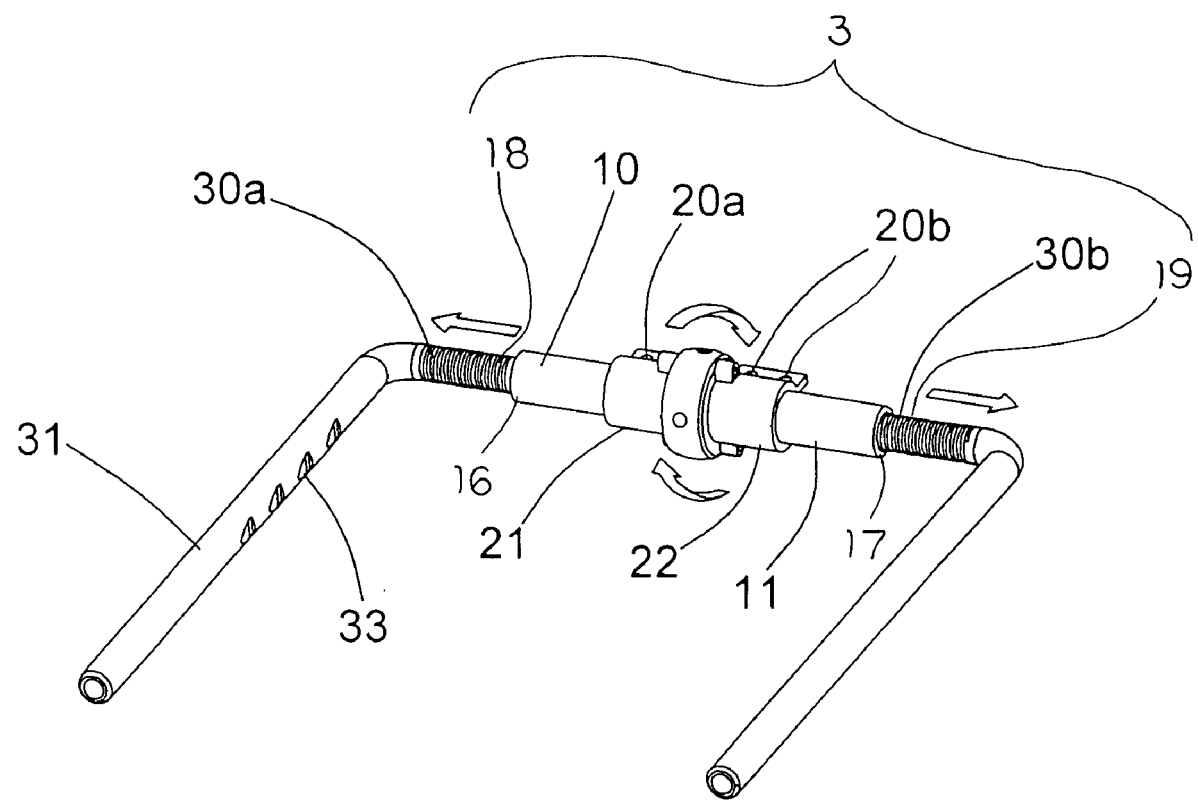
FIG. 4 is a perspective view of the adjustable mounting arrangement illustrating a rotation of the manual tuner that maximizes the engaging distance according to the preferred embodiment of the present invention.
Figure 5:
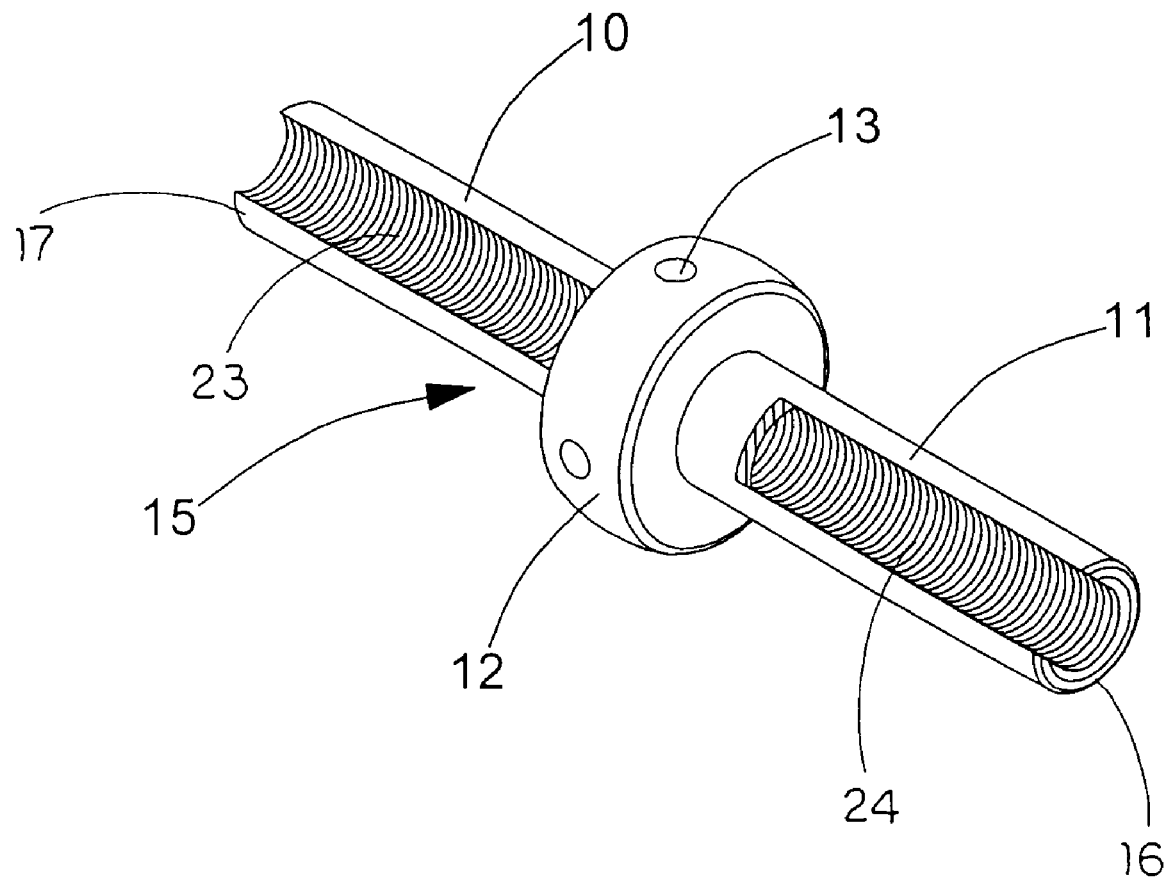
FIG. 5 is a perspective view of the control sleeves illustrating the two inner thread portions.

According to the preferred embodiment of the present invention as shown in FIG. 1, 8 of the drawings, a car seat head rest for mounting on a car seat having two spaced apart retention slots 2 comprises a head pillow 5 having a rear side, a bottom side, and an interior cavity. The car seat head rest further comprises an adjustable mounting arrangement having a length-adjustable sliding guider 3 longitudinally supported within the interior cavity of the head pillow 5 as shown in FIG. 3 and 4 of the drawings and two supporting arms 31, 32 downwardly and parallelly extended from the sliding guider 3 respectively through the bottom side of the head pillow 5 to define an engaging distance between the two supporting arms 31, 32. The two supporting arms 31, 32 are usually made of stainless steel so that they are strong, highly corrosion resisted, and can withstand any shocks and vibration from the moving vehicles when they are mounted on the car seat through the retention slots 2.

Figure 2:
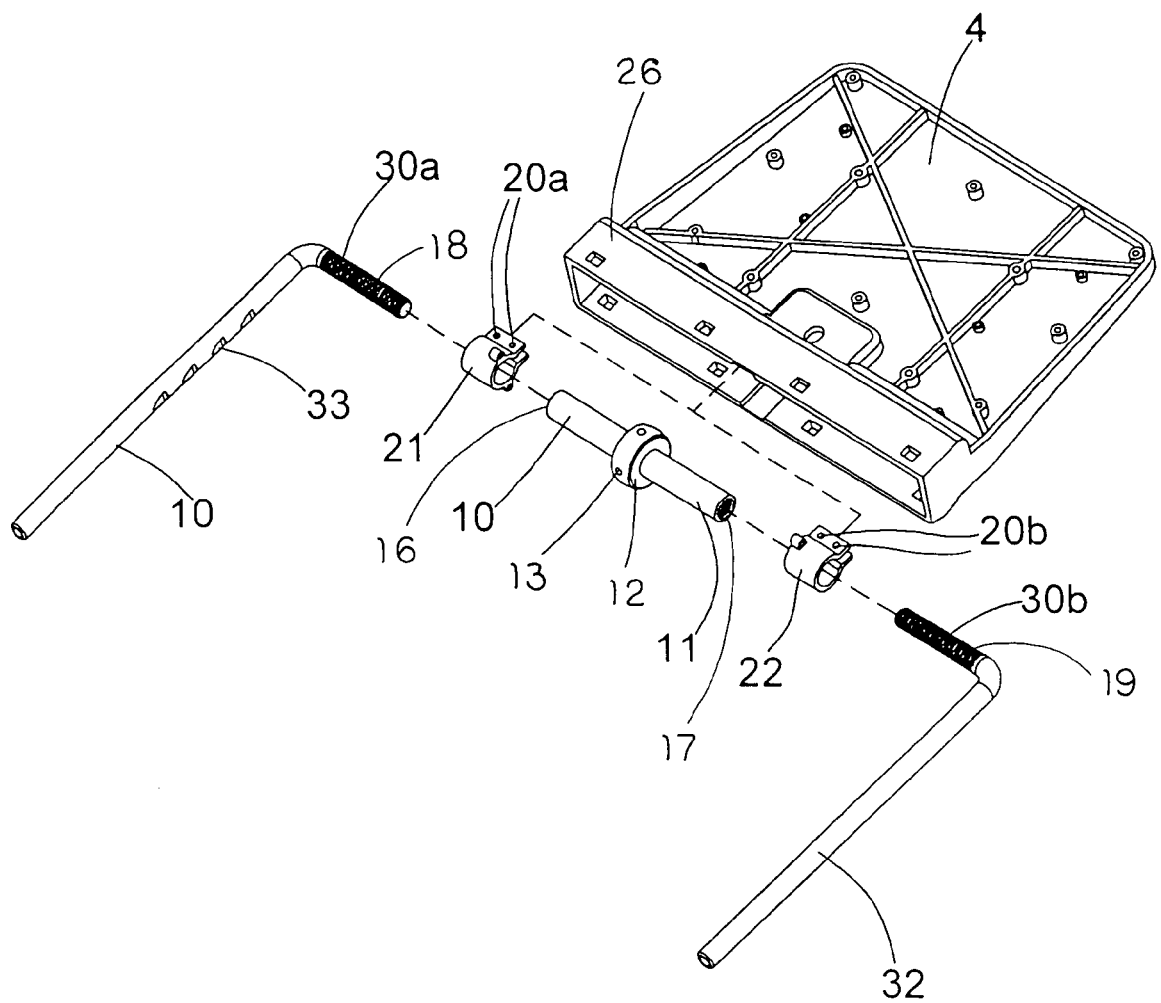
FIG. 2 is an exploded perspective view of the car seat head rest according to the preferred embodiment of the present invention.

According to FIG. 2 of the drawings, the car seat head rest further comprises an adjuster 12 provided at the sliding guider 3 to control a length of the sliding guider 3 so as to selectively adjust the engaging distance of the supporting arms 31, 32. When the engaging distance of the supporting arms 31, 32 is adjusted corresponding to a distance between the two retention slots 2 of the car seat, the two supporting arms 31, 32 are adapted for slidably engaging with the two retention slots 2 of the car seat respectively so as to securely support the head pillow 5 on the car seat. The supporting arms 31, 32 further has a plurality of slot 33 installed along thereon to couple with the two retention slots 2 such that the height of the car seat head rest can be adjusted.

The car seat head rest further comprises a display screen 34 built-in at the rear side of the head pillow 5. The adjustable mounting arrangement further comprises a supporting frame 4 upwardly extended from the sliding guider 3 within the interior cavity of the head pillow 5 to support the display screen 34 at the rear side of the head pillow 5 so as to substantially retain the display screen 34 in position. The display screen 34 provides entertainment to the passengers behind the car seat head rest such as playing a DVD movie or TV.

The two supporting arms 31, 32 are two hollow arms respectively that a communication cable of the display screen 34 is extended through one of the supporting arms 31, 32 so as to protectively conceal the communication cable within the respective supporting arm 31, 32. Therefore, the communication cable can provide signals and power required for the display screen 34 and is hidden inside the two supporting arms 31, 32 so as to keep an aesthetic appearance.

According to FIG. 2-5 of the drawings, the adjuster 12 further comprises a control sleeve 10, 11 having two side opening ends 16, 17. The sliding guider 3 comprises two sliding shafts 18, 19 engaging with the control sleeve 10, 11 at a position that inner ends of the sliding shafts 18, 19 are coaxially and slidably engaging with the side opening ends 16, 17 of the control sleeve respectively. While outer ends of the sliding shafts 18, 19 are securely attached to the supporting arms 31, 32 in such a manner that when the inner ends of the two sliding shafts 18, 19 are coaxially slid within side opening ends 16, 17 of the control sleeve 10, 11 respectively in a synchronized manner, the supporting arms 31, 32 are correspondingly moved to control the engaging distance between the two supporting arms 31, 32.

The control sleeve 10, 11 has two inner thread portions 23, 24 provided at the two opening ends 16, 17 respectively. Each of the sliding shafts 18, 19 has an outer threaded 30a, 30b portion slidably engaging with the corresponding inner thread portion 23, 24 of the control sleeve 10, 11. When the control sleeve 10, 11 is driven to rotate, the sliding shafts 18, 19 are slid correspondingly to control the engaging distance between the two supporting arms 31, 32.

The two inner thread portions 23, 24 of the control sleeve 10, 11 are extended in opposite spiral direction such that when the control sleeve 10, 11 is rotated at a clockwise direction, the sliding shafts 18, 19 are synchronically slid towards each other to minimize the engaging distance between the two supporting arms 31, 32. When the control sleeve 10, 11 is rotated at a counter clockwise direction, the sliding shafts 18, 19 are synchronically slid away from each other to maximize the engaging distance between the two supporting arms 31, 32.

The adjuster 12 further comprises a manual tuner 13, which is coaxially mounted to the control sleeve 10, 11, having a manipulating portion extending out of the interior cavity of the head pillow 5 through the bottom side thereof to drive the control sleeve 10, 11 to rotate. A manipulating tool is used to rotate the manual tuner 13 to turn the adjuster 12 such that the control sleeve 10, 11 can be rotated in the clockwise or counter clockwise depending on which way the adjuster is rotated so as to adjust the engaging distance between the two supporting arms 31, 32. FIG. 3 displays the rotation of the adjuster 12 to minimize the engaging distance between the two supporting arms 31, 32. FIG. 4 displays the rotation of the adjuster 12 to maximize the engaging distance between the two supporting arms 31, 32.

The supporting frame 4 comprises a supporting panel supported within the interior cavity of the head pillow 5 to rigidly support the display screen 34 and a base housing 26 pivotally coupling with the sliding guider 3 in such a manner that the head pillow 5 is pivotally moved for adjusting a head-supporting angle of the head pillow 5 with respect to the car seat when the supporting arms 31, 32 are slidably inserted into the retention slots 2 of the car seat respectively.

Figure 6:
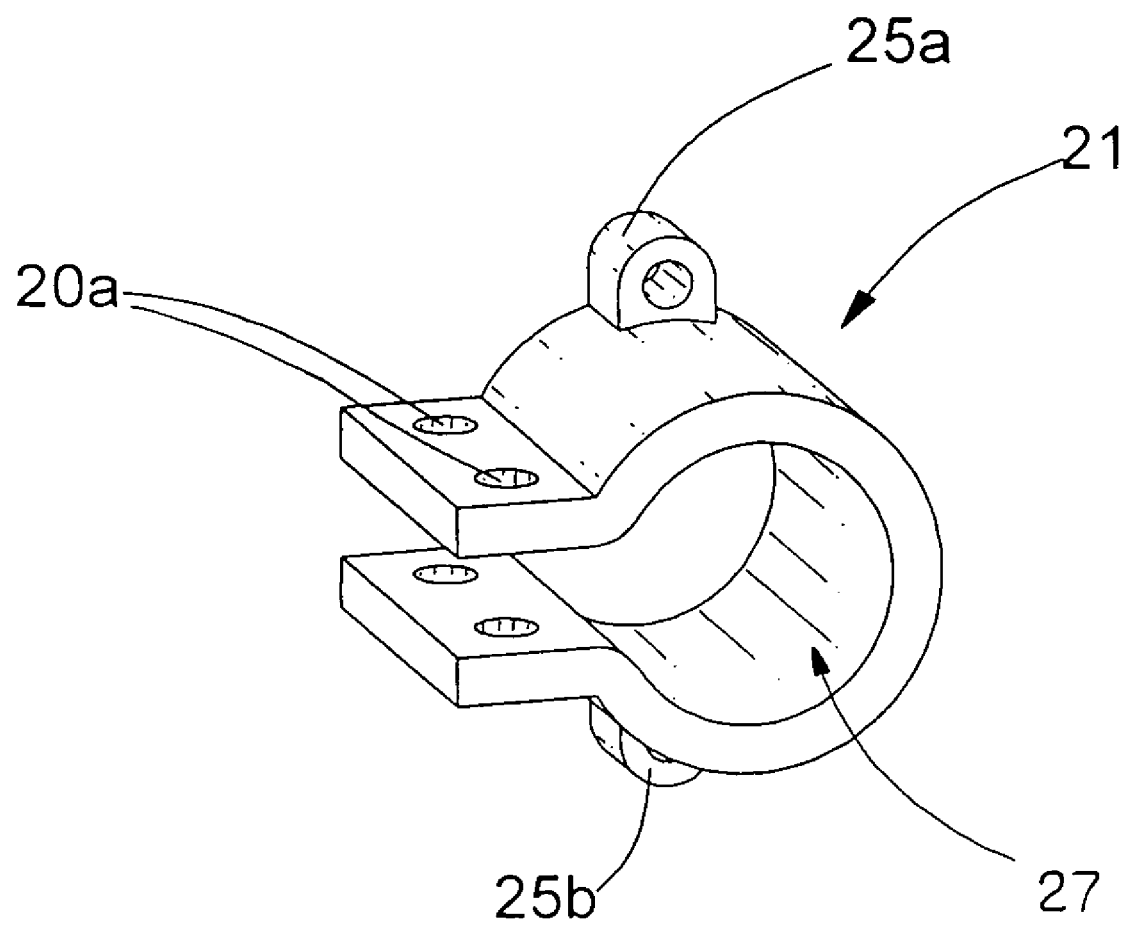
FIG. 6 is a perspective view of the U-shaped reinforcing brackets.
Figure 7:
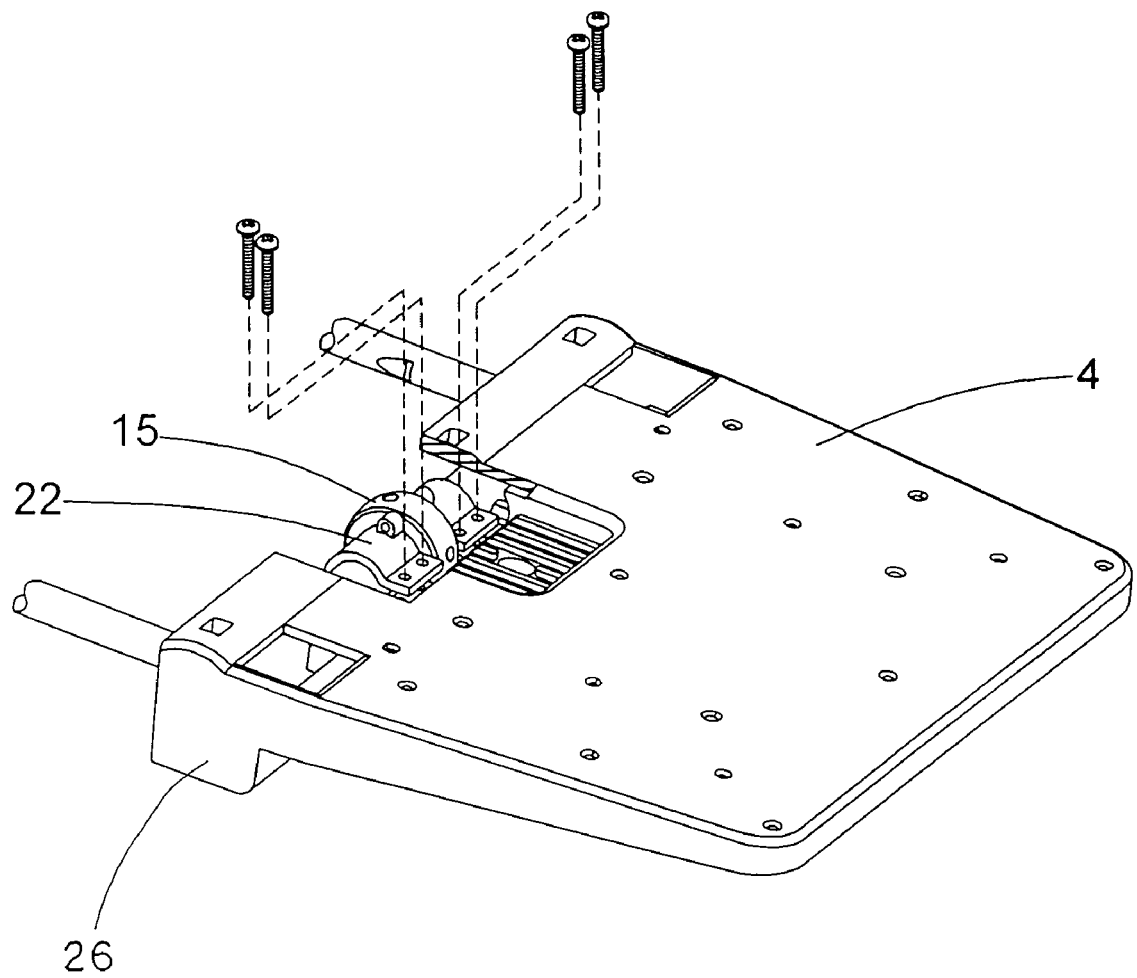
FIG. 7 is a perspective view illustrating the supporting frame and the base housing illustrating the mounting arrangement of the reinforcing brackets.
Figure 8:
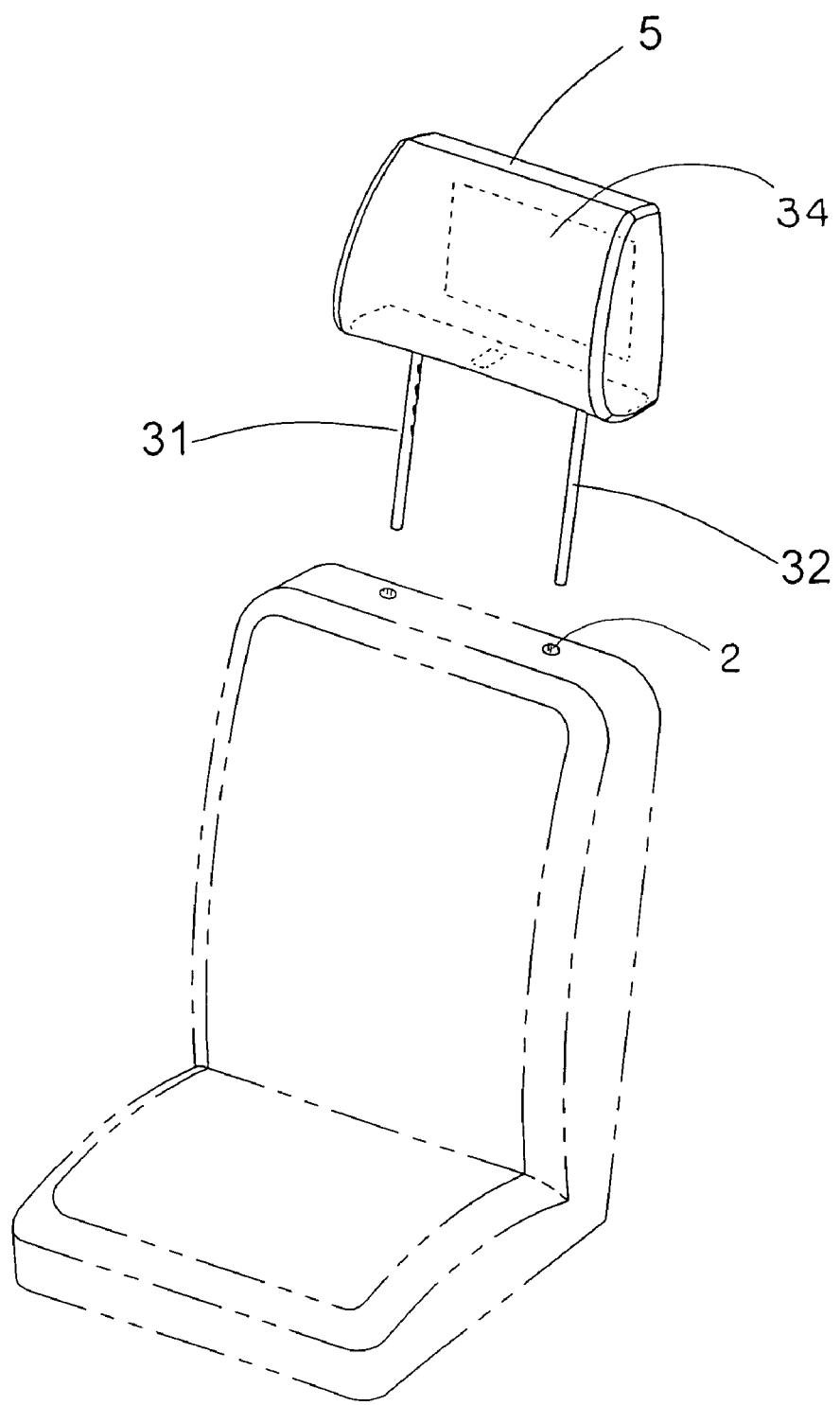
FIG. 8 is a perspective view of the car seat head rest illustrating the mounting arrangement onto the car seat.

According to FIG. 2 and 6 of the drawings of the preferred embodiment, the base housing 26 further comprises two U-shaped reinforcing brackets 21, 22. Each of the U-shaped reinforcing brackets 21, 22 has a reinforcing slot 27, mounted at two sidewalls of head pillow 5 respectively at a position that the two supporting arms 31, 32 are extended from the sliding guider 3 through the reinforcing slots 27 of the reinforcing brackets 21, 22 respectively. The reinforcing brackets 21, 22 not only reinforce the head pillow 5 but also limit the head-supporting angle of the head pillow 5 by a width of each of the reinforcing slots 27. The reinforcing brackets 21, 22 are firmly mounted onto the base housing 26 through a plurality of reinforcing hole 20a, 20b, 25a, 25b by use of simple bolts and screws.

The car seat head set comprising a bottom enclosing cover 28 mounted at the bottom side of the head pillow 5 to enclose the interior cavity thereof. The enclosing cover 28 has a tuner opening 29 for the manipulating portion of the manual tuner 13 protruding therefrom such that the manual tuner 13 can be easily rotated by the user. The enclosing cover 28 further has two elongated arm openings 35, 36 for the supporting arms 31, 32 extending out of the bottom side of the head pillow 5 through the arm openings 35, 36 respectively. The enclosing cover 28 provides a better protection for the display screen 34 and the adjustable mounting arrangement against dirt and impact.

What is claimed is:

1. A car seat head rest for mounting on a car seat having two spaced apart retention slots, comprising:
    a head pillow having a rear side, a bottom side, and an interior cavity;
    a display screen built-in at said rear side of said head pillow; and
    an adjustable mounting arrangement, which comprises:
    a length-adjustable sliding guider longitudinally supported within said interior cavity of said head pillow, and comprises two sliding shafts;
    two supporting arms downwardly and parallelly extended from said sliding guider respectively through said bottom side of said head pillow to define an engaging distance between said two supporting arms;
    an adjuster which comprises a manual tuner, and a control sleeve, having two side opening ends, engaged with said sliding shafts of said sliding guider at a position that inner ends of said sliding shafts are coaxially and slidably engaging with said side opening ends of said control sleeve respectively while outer ends of said sliding shafts are securely attached to said supporting arms in such a manner that when said inner ends of said two sliding shafts are coaxially slid within side opening ends of said control sleeve respectively in a synchronized manner, said supporting arms are correspondingly moved to control said engaging distance between said two supporting arms, so that said adjuster is adapted to control a length of said sliding guider so as to selectively adjust said engaging distance of said supporting arms, wherein when said engaging distance of said supporting arms is adjusted corresponding to a distance between said two retention slots of said car seat, said two supporting arms are adapted for slidably engaging with said two retention slots respectively so as to securely support said head pillow on said car seat, wherein said manual tuner is coaxially mounted to said control sleeve, and has a manipulating portion extending out of said interior cavity of said head pillow through said bottom side thereof to drive said control sleeve to rotate; and a one-piece supporting frame upwardly extended from said sliding guider within said interior cavity of said head pillow to support said display screen at said rear side of said head pillow so as to substantially retain said display screen in position, wherein said supporting frame comprises a supporting panel supported within said interior cavity of said head pillow and a base housing extended from said supporting panel to pivotally couple with said sliding guider in such a manner that said head pillow is pivotally moved for adjusting a head-supporting angle of said head pillow with respect to said car seat when said supporting arms are slidably inserted into said retention slots of said car seat respectively, wherein said display screen is securely supported by said supporting panel within said one-piece supporting frame to said head pillow.

2. The car seat head rest, as recited in claim 1, wherein said control sleeve has two inner thread portions provided at said two opening ends respectively, wherein each of said sliding shafts has an outer threaded portion slidably engaging with said corresponding inner thread portion of said control sleeve, such that when said control sleeve is driven to rotate, said sliding shafts are slid correspondingly to control said engaging distance between said two supporting arms.

3. The car seat head set, as recited in claim 2, further comprising a bottom enclosing cover mounted at said bottom side of said head pillow to enclose said interior cavity thereof, wherein said enclosing cover has a tuner opening for said manipulating portion of said manual tuner protruding therefrom, and two elongated arm openings for said supporting arms extending out of said bottom side of said head pillow through said arm openings respectively.

4. The car seat head set, as recited in claim 2, wherein said base housing comprises two U-shaped reinforcing brackets, each having a reinforcing slot, mounted at two sidewalls of head pillow respectively at a position that said two supporting arms are extended from said sliding guider through said reinforcing slots of said reinforcing brackets respectively, such that said retention brackets not only reinforce said head pillow but also limit said head-supporting angle of said head pillow by a width of each of said reinforcing slots.

5. The car seat head set, as recited in claim 4, wherein said two supporting arms are two hollow arms respectively that a communication cable of said display screen is extended through one of said supporting arms so as to protectively conceal said communication cable within said respective supporting arm.

6. The car seat head set, as recited in claim 5, further comprising a bottom enclosing cover mounted at said bottom side of said head pillow to enclose said interior cavity thereof, wherein said enclosing cover has a tuner opening for said manipulating portion of said manual tuner protruding therefrom, and two elongated arm openings for said supporting arms extending out of said bottom side of said head pillow through said arm openings respectively.

7. The car seat head set, as recited in claim 4, further comprising a bottom enclosing cover mounted at said bottom side of said head pillow to enclose said interior cavity thereof, wherein said enclosing cover has a tuner opening for said manipulating portion of said manual tuner protruding therefrom, and two elongated arm openings for said supporting arms extending out of said bottom side of said head pillow through said arm openings respectively.

8. The car seat head set, as recited in claim 1, wherein said base housing comprises two U-shaped reinforcing brackets, each having a reinforcing slot, mounted at two sidewalls of head pillow respectively at a position that said two supporting arms are extended from said sliding guider through said reinforcing slots of said reinforcing brackets respectively, such that said retention brackets not only reinforce said head pillow but also limit said head-supporting angle of said head pillow by a width of each of said reinforcing slots.

9. The car seat head set, as recited in claim 8, wherein said two supporting arms are two hollow arms respectively that a communication cable of said display screen is extended through one of said supporting arms so as to protectively conceal said communication cable within said respective supporting arm.

10. The car seat head set, as recited in claim 1, wherein said two supporting arms are two hollow arms respectively that a communication cable of said display screen is extended through one of said supporting arms so as to protectively conceal said communication cable within said respective supporting arm.

* * * * *